United States Patent [19]

Schlichthorst et al.

[11] Patent Number: 4,660,492
[45] Date of Patent: Apr. 28, 1987

[54] CATAMARAN AIR CUSHION WATER VEHICLE

[76] Inventors: Norbert Schlichthorst, Osterberg 7, D-2151 Beckdorf; Wolfgang Mangelsdorf, Helvetierweg 7a, D-2000 Hamburg 61, both of Fed. Rep. of Germany

[21] Appl. No.: 798,372

[22] Filed: Nov. 15, 1985

[30] Foreign Application Priority Data

Nov. 16, 1984 [DE] Fed. Rep. of Germany ....... 3442044

[51] Int. Cl.$^4$ ................................................ B63B 1/38
[52] U.S. Cl. ................................... 114/67 A; 180/117; 180/126; 114/61
[58] Field of Search ................. 114/67 A, 67 R, 61, 114/291, 271, 265, 56; 180/116–122, 126, 128, 129

[56] References Cited

U.S. PATENT DOCUMENTS

| 3,066,753 | 12/1962 | Hurley et al. | 180/126 |
| 3,384,198 | 5/1968 | Jones et al. | 180/121 |
| 3,470,839 | 10/1969 | Faul et al. | 114/61 |
| 3,559,608 | 2/1971 | Tattersall | 114/67 R |
| 3,968,762 | 7/1976 | Meyer, Jr. | 114/67 R X |
| 4,166,515 | 9/1979 | Tattersall | 114/67 A X |
| 4,469,334 | 9/1984 | Le Comte | 180/116 X |
| 4,489,667 | 12/1984 | Moore et al. | 180/126 X |
| 4,506,618 | 3/1985 | Chaplin | 114/67 A |
| 4,509,927 | 4/1985 | Ikeda | 114/291 X |

FOREIGN PATENT DOCUMENTS

| 3426333 | 1/1986 | Fed. Rep. of Germany . |
| 605245 | 9/1978 | Switzerland ...................... 114/67 R |
| 1253382 | 11/1971 | United Kingdom . |

Primary Examiner—Joseph F. Peters, Jr.
Assistant Examiner—Paul E. Salmon

[57] ABSTRACT

A catamaran air cushion water vehicle has two spaced apart floats (111) which extend parallel to one another in the direction of travel, wherein the cross-sections of the floats become broader from the bottom to the top and wherein the floats are rigidly connected together at the top by a deck structure (113). Furthermore, resilient skirts (123, 124) are arranged up to the stem and at the stern between the floats (111), extend at least approximately down to the water surface, and, together with the floats (111), bound an air space (125) between the base of the deck structure and water surface. In accordance with the present teaching the floats (111) each have a hull section (112) which broadens out in step-like manner essentially above their float region (115) which is submerged during travel in the displacement mode. The hull sections (112) serve to accommodate machinery, such as the propulsion units, and the deck structure (113) is attached to the upper end regions of the hull sections (112).

31 Claims, 9 Drawing Figures

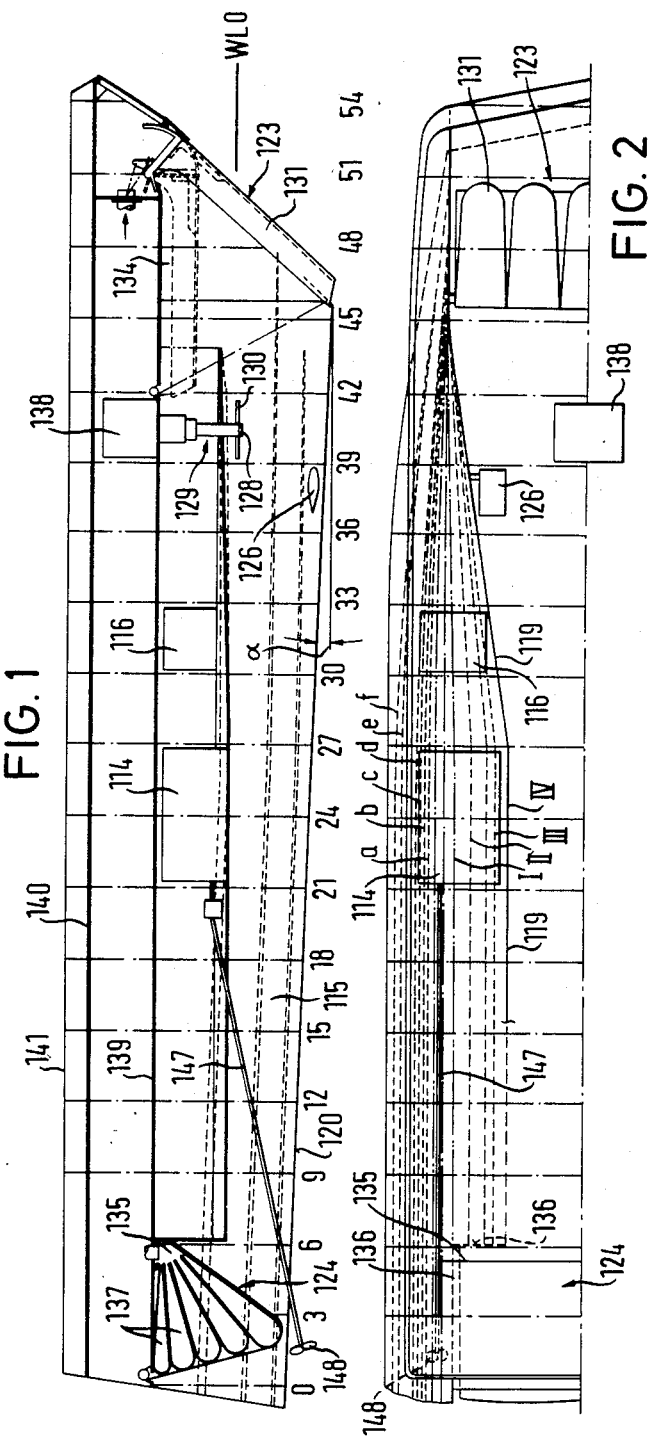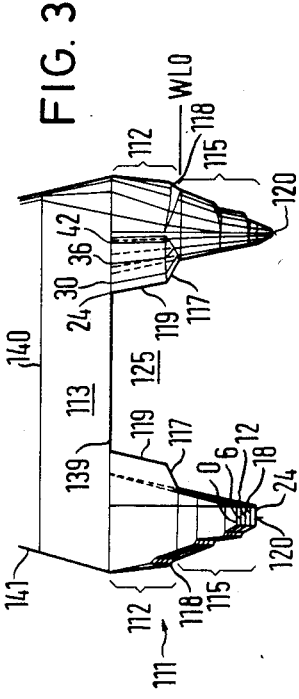
FIG. 1
FIG. 2
FIG. 3

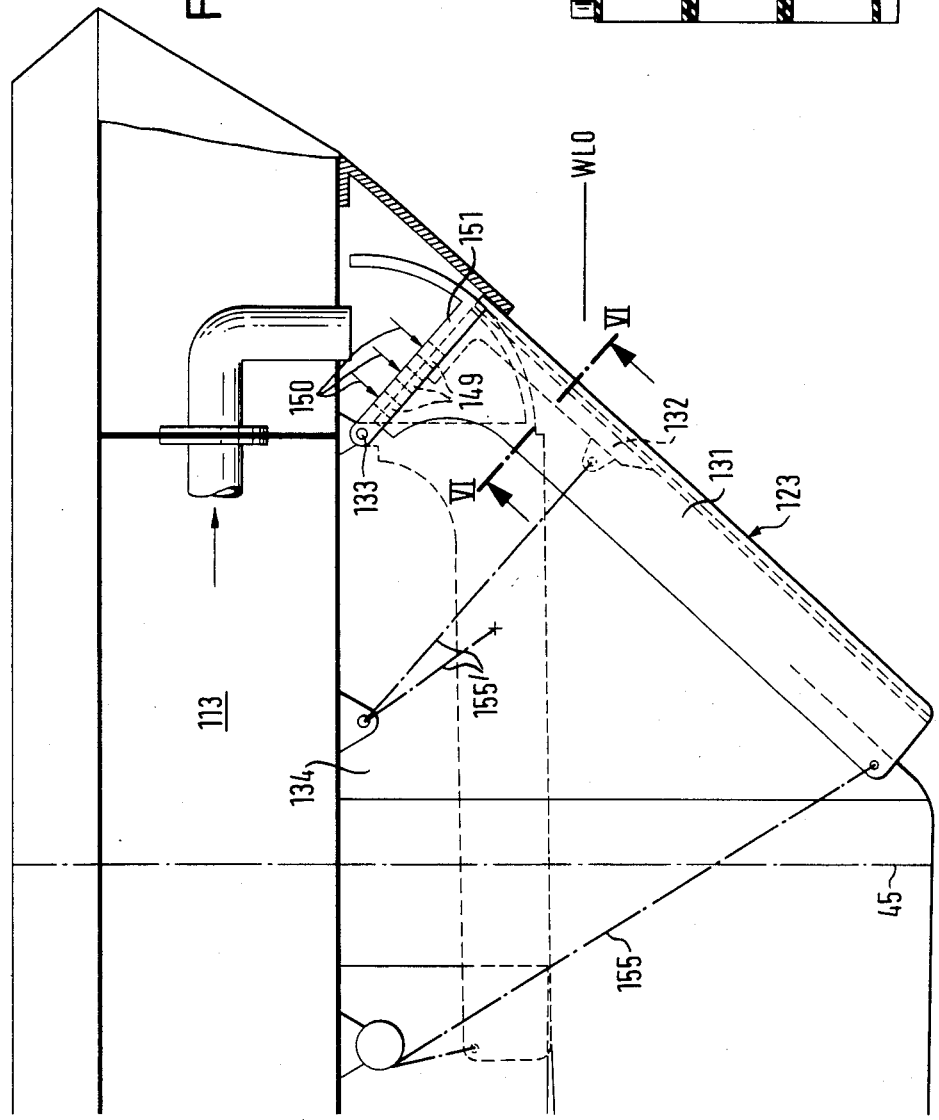

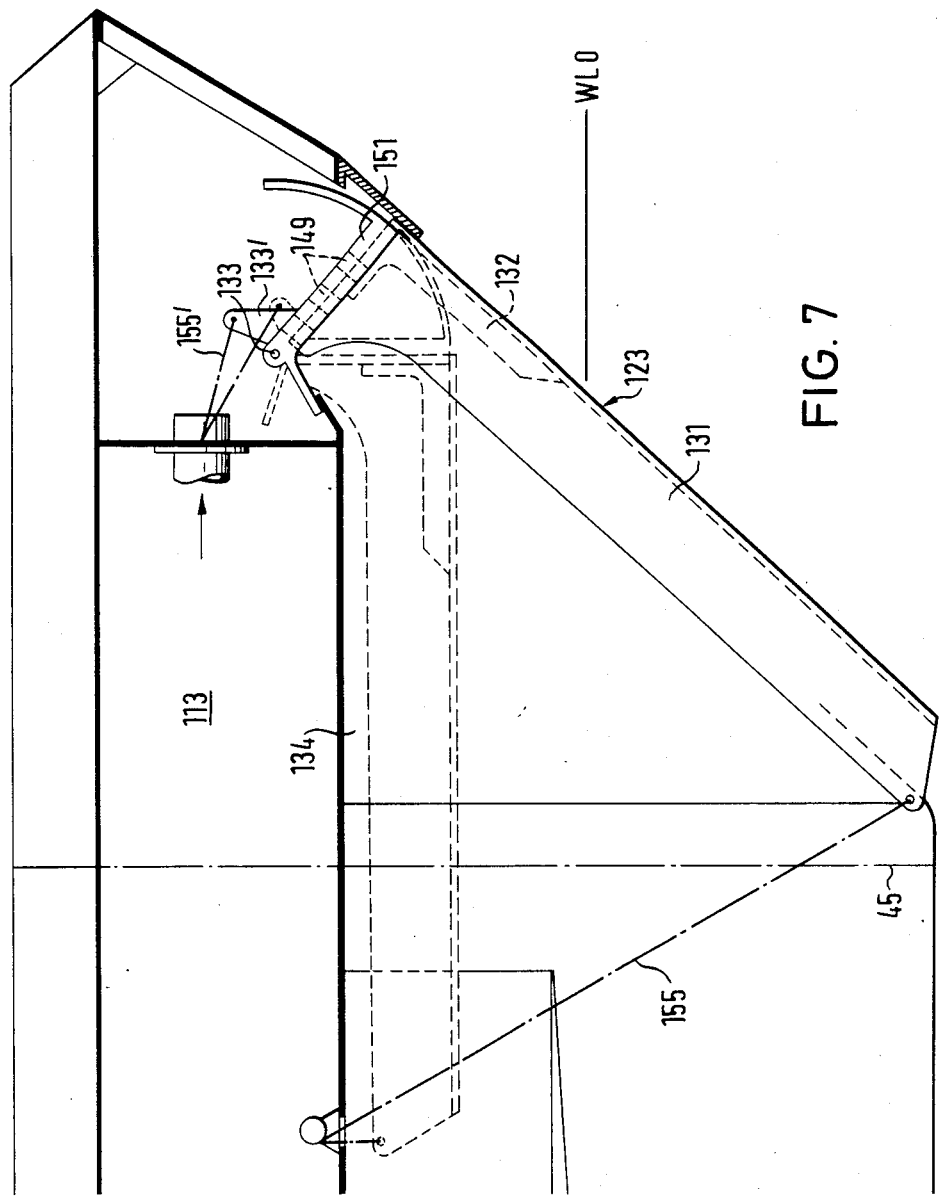

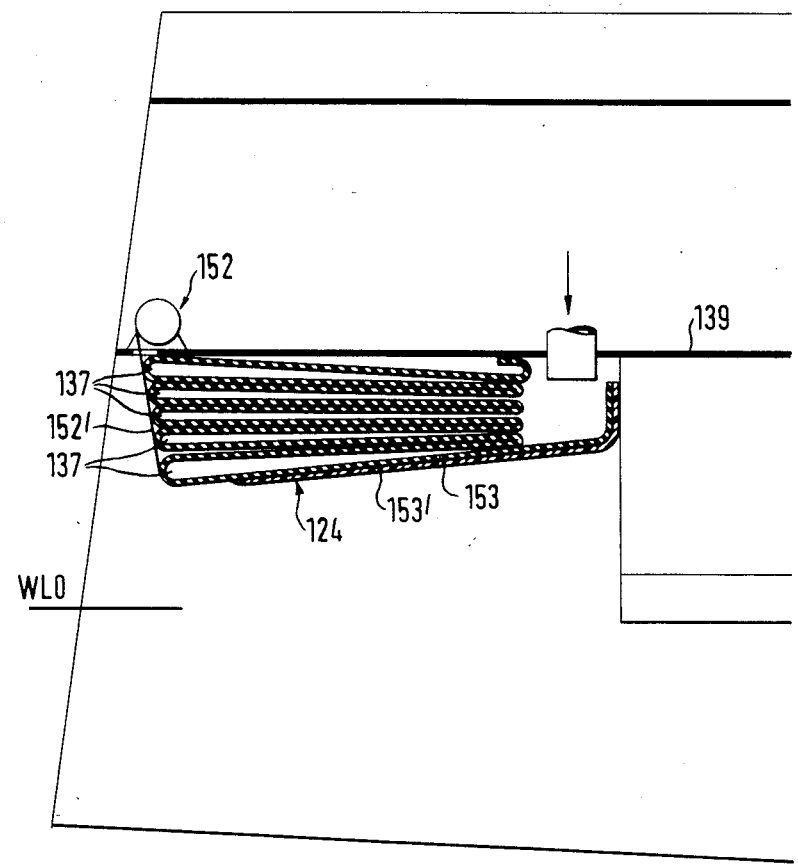

CATAMARAN AIR CUSHION WATER VEHICLE

BACKGROUND OF THE INVENTION

The invention relates to a catamaran air cushion water vehicle comprising: two spaced apart floats which extend parallel to one another in the direction of travel, wherein the cross-sections of the floats become broader from the bottom to the top but wherein the floats are rigidly connected together at the top by a deck structure; resilient skirts which are arranged at the stem and at the stern between the floats, which extend at least approximately to the water surface and, together with the floats bound an air space between the base of the deck structure and the water surface; main propulsion units which drive propulsion means arranged in the stirred region of the floats; and fans which blow air sucked in from the outside into the bounded air space beneath the bottom of the deck structure in order to lift the water vehicle from travel in the displacement mode to travel in the air cushion (hovercraft) mode.

Such water vehicles are particularly ideal for hovercraft operation because the floats or catamaran hulls which are still somewhat submerged when travelling in the hovercraft mode represent a problem-free sealed lateral boundary for the air space of the air cushion. Accordingly, resilient skirts which bound the relevant air space at the front and at the rear only need to be additionally provided between the floats at the stem and at the stern.

A disadvantage of such known catamaran air cushion water vehicles (Naval Engineers Journal, May 1984, pages 77 to 93) is the fact that they are primarily laid out for optimum hovercraft operation, whereas travel in the displacement mode merely represents a state of travel which is adopted during harbour maneuvering, when the air cushion propulsion fails, or in heavy seas, and is, in the final resort, an undesired state of travel which is only provided because it cannot be avoided in the named situations. The main propulsion units are either arranged extremely deep inside the floats, so that the floats must also be made very broad in the lower region and it is difficult to lead the shafts for the ship's propeller out of the floats (FLIGHT International Supplement, Mar. 23rd, 1967, page 31; U.S. Pat. No. 3,559,608), or are located above the floats, which results in stability problems and a steep angle of the shaft for the ship's propeller (Ship & Boat International, May 1982, page 48).

The object underlying the present invention is now to provide a catamaran air cushion craft for which travel in the displacement mode is a state of travel which is equally meritorious as travel the hovercraft mode, and for which ideal conditions prevail both from the point of view of economy and as also from the point of view of stability and travel comfort.

Optimum running behaviour of a catamaran air cushion water craft during travel in the displacement mode is in particular of great significance when this water vehicle is to be used as a warship because the water vehicle is more difficult to locate from a distance when lowered from the hovercraft mode to the displacement mode.

In order to solve this problem the invention provides that the floats each have a hull section which is broadened inwardly in step-like manner at least along a substantial portion of their total length above their float region which is submerged during travel in the displacement mode, with the hull sections serving to accommodate the main propulsion units, and with the deck structure being attached to the upper end regions of the hull sections.

In other words the broadening of the hull should primarily take place inwardly, i.e. into the space between the hulls, whereby slamming during rough seas is largely avoided. For this purpose the enlargement in width towards the inside should first take place a significant distance from the bow of the ship.

The travel comfort and travel stability during travel in the displacement mode are substantially more favorable as a result of the greater distance of the deck structure or the deck superstructure from the water line, because substantially higher waves can now pass beneath the deck structure during heavy seas. Accordingly it is possible to travel at relatively high speeds in the displacement mode even with relatively heavy seas. The greater distance of the deck structure from the water line is also favorable during travel in the hovercraft mode because in this way a softer springing of the water vehicle on the air cushion is obtained.

A further advantage of the invention lies in the fact that the deck structure which connects the two floats at the top can be kept free from the relatively bulky and also noise generating propulsion units. A largely smooth and much larger deck surface is thus available for the placement of other superstructures. The substantial and in particular step-like broadening of the floats above the water line for travel in the displacement mode is of considerable significance for the safety of the water vehicle because in this way it is not only possible to provide in advantageous manner a great deal of space for the housing of the propulsion units and further devices but instead a quite considerable reserve buoyancy is simultaneously present which is advantageous during heavy seas and also in the event that the underwater part of the floats become damaged.

The invention thus provides a catamaran air cushion water vehicle which also has troublefree running characteristics during travel in the displacement mode and which also represents a full quality water vehicle during travel in the displacement mode.

It is thus important for the invention that the upper, pronouncedly broadened part of the floats, namely the hull section which accommodates the engines, is not submerged below the water line either during travel in the hovercraft mode or during travel in the displacement mode, unless it is washed around by waves of greater or lesser height during heavy seas. In other words the stroke between the displacement mode and the hovercraft mode is substantially less than the total height of the floats. For this reason the displacement mode float region which is provided in accordance with the invention must be made sufficiently voluminous that the water displacement which it produces corresponds to the total weight of the water vehicle. This admittedly signifies a somewhat larger running resistance of the floats during travel in the displacement mode, this has however hardly any effect, because of the lower speed of the ship during travel in the displacement mode. In air cushion operation the relatively voluminous displacement mode float regions are in any event largely above the surface, so that their higher resistance can no longer have disadvantageous effects.

A particular advantage of the new concept of the present invention is the fact that a particular water vehicle in accordance with the invention can be inverted in the shortest possible time for example from operation as a fast patrol boat to operation as a mine layer or as a mine sweeper, whereby an increase in weight of from 100 to 200 tons must frequently be taken into account. In this respect the high reserve buoyancy of the floats is favourable because a slightly deeper submersion of the floats which occurs with an increase in weight means that heigher weights can be accepted in the simplest manner without the floating position of the water vehicle being substantially changed during travel in the displacement mode. The distance of the water line from the deck structure thus also remains largely unchanged even with substantially increased loading of the deck structure. The large reserve buoyancy of the hull sections also has the advantage that the water vehicle largely retain the same displacement mode running characteristics even with large fluctuations in the weights of deck structure or of apparatus arranged thereon.

Fuel or water can be accommodated in the displacement mode float regions.

It is particularly advantageous if each hull section extends over almost the full length of the ship and accommodates, in addition to the main propulsion units, also further units such as fan drive units, electrogenerators, air conditioning systems and water preparation systems.

The main propulsion units should be arranged halfway along the ship for reasons of obtaining troublefree trimming. This can be readily realised as a result of the accommodation of the propulsion aggregates in the upper region of the floats in accordance with the invention. For this purpose the said hull sections expediently have their largest widths half-way along the ship.

In order to obtain favorable behaviour in rough seas, and to maintain high speeds when travelling in the displacement mode even in the event of heavy seas, the invention provides, in accordance with a particularly preferred embodiment that the said hull sections become continuously narrower in the stem direction starting from the largest width, and in particular become narrower linearly, and finally no longer merge in step-like manner but instead continuously into the displacement mode float region.

In order to provide a lot of reserve buoyancy and a lot of housing space the said hull sections should however substantially retain the largest width in the direction of the stern.

An advantageous practical embodiment is characterised in that the height of the said hull sections half-way along the ship amounts to 0.8 to 1.2 times the height of the displacement mode float region, and is in particular approximately the same as the height of the displacement mode float region.

A very favorable reserve buoyancy associated with a great deal of additional housing space results if the width of each float half-way along the ship at the transition from the displacement mode float region to the associated hull section increases by 30 to 70%, preferably by 40 to 60% and in particular by approximately 50% in substantially step-like manner, preferably via gently rounded or inclined transition regions of low height.

A further embodiment is so arranged that the floats increase in width outwardly substantially continuously and preferably in small steps. The steps serve to reduce the wetted surface and thus the resistance.

Furthermore, it is advantageous if the transition region from each displacement mode float region to the hull section extends at an angle of approximately 20° to 40° and in particular to an angle of about 30° to the horizontal, which makes it possible for the vehicle to settle more softly in heavy seas, i.e. makes sea travel more comfortable.

It is of particular significance that the inner walls of the floats extend substantially parallel to one another from the stem to the stern.

Whereas the outer sides of the shipward vehicle have a curved profile in the longitudinal direction, the inner sides of the floats should be parallel to a first approximation in order to keep mutual influences between the floats small. The floats represent a very slender hull with parallel lines over at least two thirds of the total length.

The broadening of the hull in the upper region of the floats at the inner side is, viewed from the point of view of its shape, an additional half hull of the polygonal frame type.

A further advantageous embodiment is so constructed that the keel line of the floats arises slightly from the stem to the stern, and indeed preferably linearly at an angle of 1° to 3° and in particular of approximately 2°.

In this way the higher buoyancy obtained in the rear region through broadening of the floats can be compensated for in order to obtain a horizontal floating position.

It is of importance for the safety of the ship that, in accordance with a further advantageous embodiment, the floats are subdivided by at least one, preferably by several decks, into buoyancy chambers which are sealed relative to one another. A deck should in particular be located in the transition zone from the displacement mode float region to the associated hull section of each float.

If now one of the floats is damaged under water, and thus becomes leaky, for example due to the explosion of a mine or the like, the floats in the region of the hull sections take over the float function and the vehicle still remains fully floating and maneuverable.

The invention can be used with particular advantage with an arrangement of the propulsion units of the type described in DE-OS No. 34 26 333. In this case the arrangement should, in accordance with the invention, be such that the main propulsion units, and optionally also the fan drive units, are constructed as containers which are suspended at their top side from the deck structure and, at their lower side, are merely braced sideways and in the longitudinal direction against the structure of the floats.

A further object of the invention is to substantially improve the buoyancy effect of the air cushion without increasing the energy supply. For this purpose a further embodiment of the invention, which can also be used with advantage without the previously described features, provides that the exhaust ducts of the combustion engines of the main propulsion units, and in particular also of the fan drive units, and preferably also of any generators, open into the space bounded by the floats and the skirts, in particular into the air space which is located above the water surface during travel in the displacement mode, with the air cushion pressure being smaller than or the same as the exhaust gas pressure of the attached combustion engines.

The exhaust gas pressure of the combustion engines for the various drive units, which are preferably constructed as Diesel engines, is thus additionally exploited in advantageous manner to provide the air cushion. This is possible, because the exhaust gas pressure of normal Diesel engines lies in the order of magnitude of 1800 mm of water column which is larger than the buoyancy pressure generally present in the air cushion.

In principle, all combustion engines can be connected in this manner to the air space between the floats, it is however primarily just the two main drive motors which are so connected.

As a result of the invention it is however not only the exhaust gas pressure but in particular also the volume of exhaust gas which emerges from the combustion engines which is exploited to provide the air cushion. In this way the lifting capacity of the air cushion can be increased by about 10%.

A further advantage which is obtained by the exhaust gas ducting of the invention, and which is particularly important in warships, is the fact that the exhaust gases are greatly cooled by mixing them with air and also with water spray before they emerge from the rear skirt. In this way the emitted infrared radiation is considerably reduced and thus the location of a ship of this kind as a result of infrared radiation is made substantially more difficult. The omission of exhaust gas ducts through the deck structure also represents a substantial advantage of this embodiment.

The opening of the exhaust ducts above the water line is preferred because in this way less hull noise is transferred to the body of water, so that sonar location of the vehicle is made more difficult.

Catamaran water vehicles with stabilizer fins arranged on the floats at the inside are already known (DE-OS No. 23 12 488).

A further object of the invention is however not only to obtain a dynamic stabilization of the water vehicle without the fins which are necessary for this purpose being exposed to damage, particular during maneuvering in harbours, but also to achieve additional effects using the stabilizer fins.

In order to satisfy this object the invention provides that stabilizer fins which are pivotable about transverse axes are arranged at the lower end region of the floats at the inside, with the stabilizer fins being so controlled that they assist the transition from travel in the displacement mode into travel in the air cushion mode and/or the exceeding of a critical speed range during travel in the hovercraft mode at higher speeds. In particular a pair of stabilizer fins should be provided at the stem. Stabilising fins can optionally be provided in the stern region of the ship.

The fact that the stabilizer fins extend inwardly into the space between the catamaran floats means that they move on the one hand in more uniformly flowing water and on the other hand that the danger of them being damaged is considerably reduced. The control takes place not only for pitch damping but rather in particular also as a buoyancy aid in the transition from travel in the displacement mode to travel in the hovercraft mode. In this way the lifting engines can be relieved and a power saving is made possible, in addition to exploiting the exhaust gas pressure of the Diesel engines. The combination of the air cushion with a certain lifting force of the stabilizing fins, which are designed as lift generating wings, has shown itself to be particularly favorable.

The stabilising fins have also proved to be favorable when a critical speed range lying about 25 knots is to be exceeded during travel in the hovercraft mode. This critical speed range can be overcome with a small expenditure of energy by controlling the stabilizer fins at the stern in particular. A particularly favorable stabilizing fin arrangement is characterised in that one pair of stabilizing fins is provided in the first third of the floats, and in particular in the first quarter of the floats, and two pairs of stabilizing fins in the last quarter of the floats—as viewed from stem to stern.

The control of the stabilising fins takes place primarily in such a way that the excursions of the stabilizing fins (angle of deflection) which are called up to stabilize the ship's movements are superimposed on the excursions which are required to lift the ship's hull during the transition into the hovercraft mode, or to achieve a certain permanent lift.

The stabilization by means of the stabilizing fins is primarily provided for operation in the hovercraft mode, the stabilization can however also be used in accordance with the invention in expedient manner to make travel in the displacement mode substantially calmer and more stable.

A particular problem with hovercraft is the arrangement of sonar devices because the floats naturally operate, depending on the mode of travel, with very different drafts. A sonar apparatus which can be extended sideways out of the ship's hull and downwardly is already known (Combat Craft, May 1983, page 101). Because of the out of center arrangement a one-sided moment is exerted on the ship when the sonar device is submerged below the water surface. A centrally extendable sonar apparatus is known from GB-PS No. 12 53 382.

The invention seeks to provide an arrangement of the sonar device which is particularly suited for the catamaran air cushion water vehicle of the invention and which also takes on further functions. In this respect the invention starts from the concept of a water vehicle wherein a downwardly extendable and retractable column carrying a sonar device at its lower end is arranged on the deck structure between the floats, with the lower end of the column being submersible below the water surface both during travel in the displacement mode and during travel in the hovercraft mode.

In order to satisfy this object provision is made, in accordance with the invention, for a stabilizing fin arrangement at the lower end region of the column which preferably continuously lies beneath the water surface during travel in the displacement mode. The column is in particular telescopically extendable and retractable.

It is particular expedient if in the retracted state of the column its lower end is located under water during travel in the displacement mode. The sonar device is thus continuously in its working position during travel in the displacement mode. The sonar device only emerges from the water surface during travel in the hovercraft mode, can however be brought back into its operating position by extending the column.

Thus, in accordance with the invention, the column of the sonar device is additionally exploited as a stabilizing element. A three point support in conjunction with the movable stabilizing fins is particularly advantageous for this arrangement, with the stabilizing fin arrangement at the lower end of the sonar column however generally not being adjustable, i.e. executing a purely static stabilizing function.

In order to be able to transmit or receive from different directions the sonar device is expediently angularly adjustable. Furthermore, it is expedient if the stroke of the sonar device is larger than the height difference between travel in the displacement mode and travel in the hovercraft mode and indeed is preferably 40 to 60% and in particular approximately 50% greater than this height difference. In this way different depths of the sonar device below the water surface can be selected so that ideal matching to the requirements of a particular sonar oscillator is possible.

The column should be arranged at the center between the floats whereby moments which impair the course stability of the moving ship can be effectively avoided.

The sonar device can, in accordance with the invention, be active or passive. The stabilizing fin arrangement can also consist of a lift generating wing section which as a whole is of circular shape. The sonar oscillator can either sit between the lift generating vanes or be built into the optionally circular structure of the wing.

The sonar column should be submerged as little as possible below the water surface for the prevailing operating mode in order to avoid deleterious effects on the running resistance as far as is possible.

The sonar devices are used for searching for submarines and mines. The arrangement between the floats is also of particular advantage because the individual hulls or floats are too slender for a bow or hull installation.

Whereas a conventional sonar device requires a vertical stroke of 3 to 4 m, which also impairs the stability of the variable length column which must be correspondingly constructed, it is possible, in accordance with the invention, to use a substantially lower stroke which is merely sufficient to compensate for the height variation between travel in the displacement mode and in the hovercraft mode. The decisive feature in this respect is the fact that the sonar device remains continuously submersed in water during travel in the displacement mode. In this way the stroke can be substantially reduced.

Whereas, during travel in the displacement mode the speed lies at around 20 knots the speed of the ship during operation in the hovercraft mode can be up to 40 knots.

In this respect the retractability of the sonar device so as to reduce the resistance is of particular significance.

A particular disadvantage of a known catamaran air cushion craft is the fact that the skirts provided at the stem and at the stern to bound the air cushion air space are continuously submersed below the water surface during travel in the displacement mode. In this way the running resistance during travel in the displacement mode is considerably increased and the skirts are subject to rapid wear. This also applies to a catamaran water vehicle in accordance with CH-PS No. 495 248 in which the skirts are pivotable and are arranged to float on the water surface.

In order to reduce the running resistance and to achieve troublefree running characteristics also when operating in the displacement mode the stem and/or stern skirts can be moved out of their operating position for travel in the hovercraft mode, and can in particular be elevated, and preferably rearwardly pivoted, to such an extent that during travel in the displacement mode they no longer or only unimportantly contact the water surface, at least in calm water.

This can be achieved in two ways. If one is concerned with a water vehicle in which a front skirt is formed by resilient pockets which are folded rearwardly and rounded at the front, which are secured at the top to the deck structure and which are preferably flowed over by the lifting air from above during travel in the hovercraft mode, then the invention provides that pivot arms which extend substantially from the top downwardly are secured in the front region of the pockets, are pivotable rearwardly about an upper transverse shaft and, on being pivoted, pivot the regions of the elastic pockets which would come into contact with the water surface during travel in the displacement mode upwardly away from the water surface.

A further possibility is that the upper mounting of the pockets remains unchanged when they are pivoted upwardly and that the pockets are resiliently deformed. In the latter case a chamber should be provided above the front skirt to accommodate the elevated skirt.

In order to ensure troublefree sealing during hovercraft operation the stern skirt should extend into lateral internal recesses of the floats.

If one is concerned with a hovercraft in which the rear skirt consists of resilient pockets which extend parallel to one another and are arranged substantially behind one another, then the construction is preferably such, in accordance with the invention, that the pockets are connected to a source of air pressure and are selectively inflated or relieved of pressure.

The ability to draw in the skirts during travel in the displacement mode however not only reduces the running resistance but also considerably reduces the wear of the skirts. High speeds of 20 knots can only be obtained by complete elimination of the running resistance created by the skirts. The pivotability of the rear skirts can be achieved relatively simply by a transversely extending cushion construction and by a linkage (actuation pneumatic) similar to that used for the hood of a pram.

The ability to pivot the front skirt away from its operating position means that it is necessary to provide a special space to accommodate the skirt in the upwardly pivoted state. In order to fold away the front skirt one can however also exploit the fact that the individual resilient pockets are from their very nature sufficiently resilient that they can yield to heavy blows in rough seas. This flexibility can also be exploited in such a way that the front skirt is so resiliently deformed, by the action of mechanical adjustment means, that all regions of the skirt are brought above the water surface during travel in the displacement mode without the provision of special folding means.

In general a part of the air flow for generating the air cushion is expelled in the area of the skirts in order to stabilize the resilient skirts through the corresponding pressure.

Instead of making the skirts so that they can be pivoted upwardly they can also be made so that they can be drawn in.

The drawing in of the resiliently arranged skirts could for example be achieved by lines arranged at their ends, with the lines being capable of being drawn in by suitable winches in order to swing the skirts upwardly.

The skirts are preferably adjustable and fixable in various intermediate positions between the position for pure displacement travel and the position for pure hovercraft travel. In this manner various states of travel between pure displacement travel and pure hovercraft travel can be realized, with the various intermediate positions being dependent on the state of the sea, or on the available draft, and also being selectable in dependence on how high the vehicle is allowed to project above the water surface from the point of view of possible detection by the opponent. The invention is particularly suitable for water vehicles with a weight of 700 to 1000 tons (for example mine layers).

It is particularly suited for fast patrol boats in the speed range from 300 to 500 tons with it being possible to achieve speeds of up to approximately 40 knots when operating the hovercraft mode while speeds of 20 knots can be achieved in the displacement mode.

BRIEF DESCRIPTION OF THE DRAWINGS

The invention will now be described in the following in more detail with reference to the drawings which show:

FIG. 1. a partly sectioned side view of a catamaran air cushion water vehicle in accordance with the invention, FIG. 2 a partly sectioned plan view of the water vehicle of FIG. 1, wherein only the port half is illustrated because the starbord half is of completely symmetrical construction thereto, FIG. 3 a schematic end on view of the water vehicle of FIGS. 1 and 2 with the starbord half showing the lines of the stem of the ship and the port half showing the lines of the stern of the ship, FIG. 4 an enlarged view analogous to FIG. 3 to symmetrically illustrate the arrangement of various units in accordance with the invention, FIG. 5 a schematic side view of a first embodiment of the front skirt of the air cushion water vehicle of the invention, FIG. 6 a schematic sectional view of the lines VI—VI of FIG. 5, FIG. 7 a schematic partly sectioned side view of a further embodiment of the front skirt of a catamaran air cushion water vehicle in accordance with the invention, FIG. 8 a schematic side view of an upwardly pivotable stern skirt for the catamaran air cushion water vehicle of the invention in the operative position for the air cushion mode, and FIG. 9 the same view as FIG. 8, however with the rear skirt being shown in the upwardly pivoted state.

DETAILED DESCRIPTION

Figure 4:
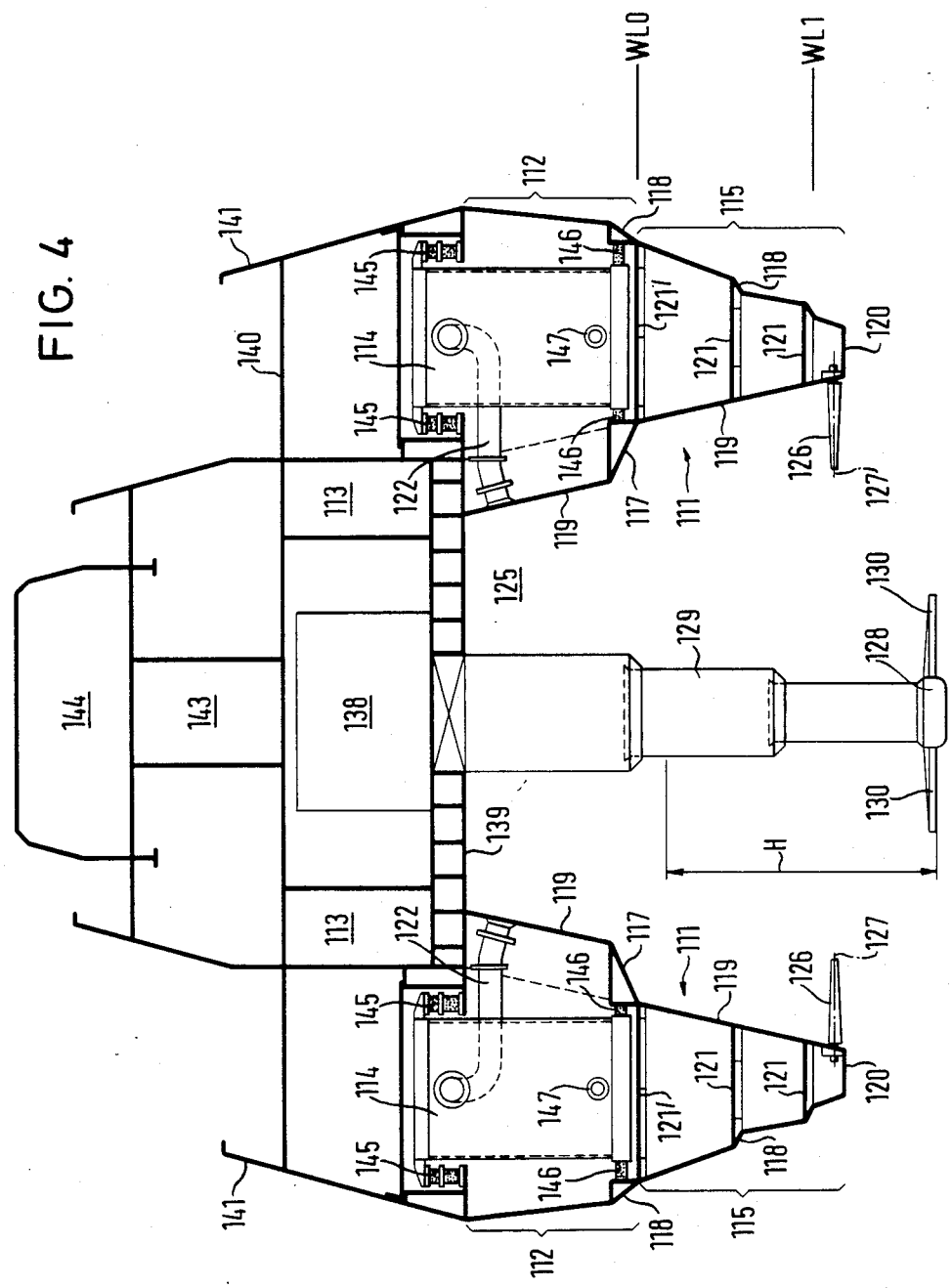

As seen in FIGS. 1 to 3 the two floats 111 of a catamaran air cushion water vehicle in accordance with the invention have frames 0, 3, 6, 12, 18, 24 in the stern part of the ship and frames 30, 36, 42, 48, 54 in the stem part of the ship (forecastle).

Stringer lines a, b, c, d, e, f are provided at the outer side of the floats 111. Stringer lines I, II, III and IV are provided on the inner side of the floats 111.

The keel line is designated with the reference numeral 120.

As seen in FIGS. 1 to 4 a deck structure 113, which can for example include a hull base 139 and a main deck 140 arranged spaced above it, extends between the upper ends or sides of the floats 111. The main deck 140 is for example surrounded by a breastwork or railing 141.

As seen in FIG. 4 further superstructures 143 and 144 can be provided on the main deck 140.

In accordance with the invention the two floats 111 are subdivided in accordance with FIGS. 1 to 4 into a lower displacement mode float region 115 and a hull section 112 which is arranged above it.

The precise lines of the hull section 112 which accommodates the machinery and of the displacement mode float region 115 can be seen in particular from FIGS. 1 to 3. As seen in these figures the floats 111 become broader in the displacement mode float region 115 at a relatively narrow angle with small steps 118 being provided at the outer sides which serve stabilization purposes and to reduce the resistance.

At the inner side of each float there is however a transition region 117 which defines a clear step between the displacement mode float region 115 and the hull section 112, i.e. the hull section 112 is substantially broadened towards the inside relative to the displacement mode float region 115, the word inside will be understood to mean here in the direction towards the space between the two floats. As, in accordance with FIGS. 3 and 4, each hull section 112 also extends beyond the outer side than the displacement mode float region 115, as a result of the inclined shape of the outer walls, a broad accommodation chamber is formed in the upper half of each float 111 for accommodating the main propulsion units 114. As seen in FIG. 4 the main propulsion units are constructed as containers and are suspended via damping support elements 145 by their upper sides from the structure of the floats 111 and/or from the deck structure 113.

In the lower region the propulsion units 114 are simply braced by means of shock dampers 146 in the lateral direction and in the longitudinal direction (not illustrated) against the structure of the floats 111.

As seen in FIG. 1 the main propulsion aggregates 114 are housed half-way along the ship within the upper region of the floats 111. Drive shafts 147 which are only schematically illustrated in FIGS. 1 and 4 act on the propellers 148 which are arranged at the ends of the floats 111.

Fan drive units or aggregates 116 are accommodated inside the hull sections 112 of the floats 111 in front of the main propulsion units 114. These fan drive units suck in air from the outside which is then expelled through outlet openings, which are illustrated, into the air space 125 (FIGS. 3, 4) which is bounded at the sides by the floats 111, and at the front and at the rear by resilient skirts 123, 124 (FIG. 1).

It is important that the inner walls 119 of the floats 111 extend substantially parallel to one another in accordance with FIG. 2, at least from the region of the center of the ship to the stern. In the region of the forecastle the walls 119 extend slightly conically towards one another from the outside towards the inside.

The keel line 120 includes a small angle α of approximately 2° with the horizontal as shown in FIG. 1.

As seen in FIG. 4 the displacement mode float region 115 of each of the floats 111 is subdivided by two decks 121 into two buoyancy chambers which are sealed relative to one another. At the top the displacement mode float regions are sealingly closed by a deck 121'. The hull section 112 only commences above this deck.

The subdivision of the floats via the decks 121, 121' ensures that if one of the buoyancy chambers should become leaky then the remaining buoyancy chambers can still generate at least sufficient buoyancy that the water vehicle as a whole remains able to float.

As seen in FIG. 4 the exhaust ducts 122 of the main propulsion units 114, which contain Diesel engines, are led to the inner walls 119 of the floats 111 where they emerge into the air space 125 substantially above the water line WL0 for travel in the displacement mode.

The catamaran air cushion craft of FIGS. 1 to 4 floats during travel in the displacement mode at the water line WL0 (FIG. 4), i.e. during travel in the displacement mode in calm water the hull sections 112 of the floats 111 lie above the water surface WL0. A distance of 1 to 3, in particular of approximately 2 m thus remains between the water line WL0 and the deck structure 113 for its base 139. The water vehicle can now travel as a normal catamaran with the deck structure being largely protected against flooding as a result of waves by the high free space between the water line WL0 and the hull base 139.

The low arrangement of the main propulsion units 114 make it impossible to keep the inclination of the drive shafts 147 (FIG. 1) relatively low, which is is also assisted by the arrangement of the propulsion units approximately at the middle of the ship. By sinking the propulsion units 114, 116 into the floats one obtains a largely free deck surface on which other suitable superstructures can be housed.

As the exhaust gases flowing through the exhaust ducts 122 also flow between the catamarans 111 during travel in the displacement mode they are well mixed with air and optionally with water spray before they emerge at the stern of the vehicle, so that they emerge strongly cooled from the ship's hull and thus make infrared detection substantially more difficult.

As seen in FIGS. 1, 2 and 4 stabilizer fins 126 which are pivotable about transverse axes 127 are provided right at the bottom at the inner side of the floats 111. The stabilizer fins can be actuated from a central control unit both in the sense of an anti-roll action and also in the sense of an anti-pitching action. Moreover, the stablizing fins 126 can be slightly inclined for the purpose of a simple transition of the water vehicle from operation in the displacement mode to operation in the hovercraft mode. As seen in FIG. 1 the stabilizing fins 126 are provided in the front regions of the floats 111.

When the water vehicle is to be operated in the hovercraft mode the ventilator units 116 (FIG. 1) are switched on whereupon the air sucked in from the outside is forced in manner not shown into the air space 125. The air pressure and the quantity of the air are calculated in such a way that the vehicle is now lifted up to the waterline WL1 (FIG. 4), with the displacement mode float regions 115 of the floats 111 only being submersed to a small degree below the water surface, so that on the one hand a stabilizing effect is achieved and so that on the other hand the drive propellers 148 are still sufficiently deeply submerged below the water surface and can thus generate the required propulsive thrust.

The exhaust gases of the main propulsion units 114 which emerge from the exhaust ducts 122 into the air space 125 and optionally also the fan propulsion units 116 and any Diesel generators assist in lifting the water craft. The stabilizing fins 126 can be so inclined that they also contribute to the buoyancy which is in particular important for a easy transition from travelling in the displacement mode to travelling in the hovercraft mode because then the units provided for generating the air cushion can be made somewhat less powerful.

In accordance with FIGS. 1, 2 and 4 a sonar device 138 is arranged in the front region of the water vehicle on the deck structure 113 at the center between the floats 111. The sonar device has a central telescopic column 129 which projects downwardly from the hull base 139 and the sonar device 128 which can be actively and/or passively operated is located at the lower end of the central telescopic column. Alongside the sonar device the column 129 has stabilizing fins 130 at its lower end. The stablizing fins can have a lifting wing profile and can also be made circular with the sonar device 128 at the center.

When travelling in the displacement mode the column 129 is fully retracted in accordance with FIG. 1, with the sonar device 128 and the stabilizing fins 130 being submersed slightly below the water line WL0 and being operational.

In the extended state the telescopic column 129 adopts the position shown in FIG. 4 in which the sonar device 128 and the stabilizing fins 130 are also submerged below the water line WL1 for hovercraft operation when travelling in the hovercraft mode.

In accordance with FIG. 5 the front skirt 123 of the catamaran air cushion craft consists of individual resilient pockets 131 which are manufactured of a resilient material, for example reinforced rubber, and which each have reinforcements at their upper edges and a connection lug at their centers.

Numerous resilient pockets 131 of this kind are arranged alongside one another in order to form the skirt 123 (FIG. 6).

As seen in FIG. 5 the pockets 131 open at the top at an intermediate floor 151 which is provided with holes 149. Air is blown through the intermediate floor 151 in the direction of the arrows 150 from the fans (which are not illustrated) during hovercraft operation. This not only generates the air cushion but also so stiffens the resilient pockets 131 that they adopt the position which can be seen from FIG. 5.

In accordance with the invention, and as shown in FIGS. 5 and 6, pivotal arms 132 are arranged in the front rounded regions of the pockets 131 and are fixedly connected with the pocket material. At the top the pivot arms 132 are mounted on a transverse throughshaft 133 about which the skirt 123 as a whole can be rearwardly pivoted so that the pockets 131 adopt the rearwardly pivoted position shown in broken lines in FIG. 5. The decisive feature is the fact that the resilient pockets 131 are hereby lifted above the water line WL0 during travel in the displacement mode so that in this case the front skirt 123 no longer contacts the water surface, at least in calm water, which signifies a substantial reduction of the running resistance. The pivotal movement can be affected by means of a cable 155 which acts at the lower edge of the skirt 123, or by a hydraulic cylinder or pulling dèvice 155' which acts on the pivot arms 132.

The resilient pockets 131 of the front skirt 123 can also be pivoted further upwardly if the intermediate floor 151 together with the holes 149 is also pivoted upwardly together with it. In each case a room 134 must be provided above the skirt 123 to accommodate it. In the extreme case the skirts 123 can be pivoted upwardly sufficiently far that they no longer project into the air space 125 between the floor of the hull and the water line WL0 which results in an ideal production in resistance even during heavy sea movement. Furthermore, in the embodiment of FIG. 7, provision is made for a hydraulic device 155' to act on a pivotal arm 133' in order to pivotally move the skirt 123.

Figure 8:
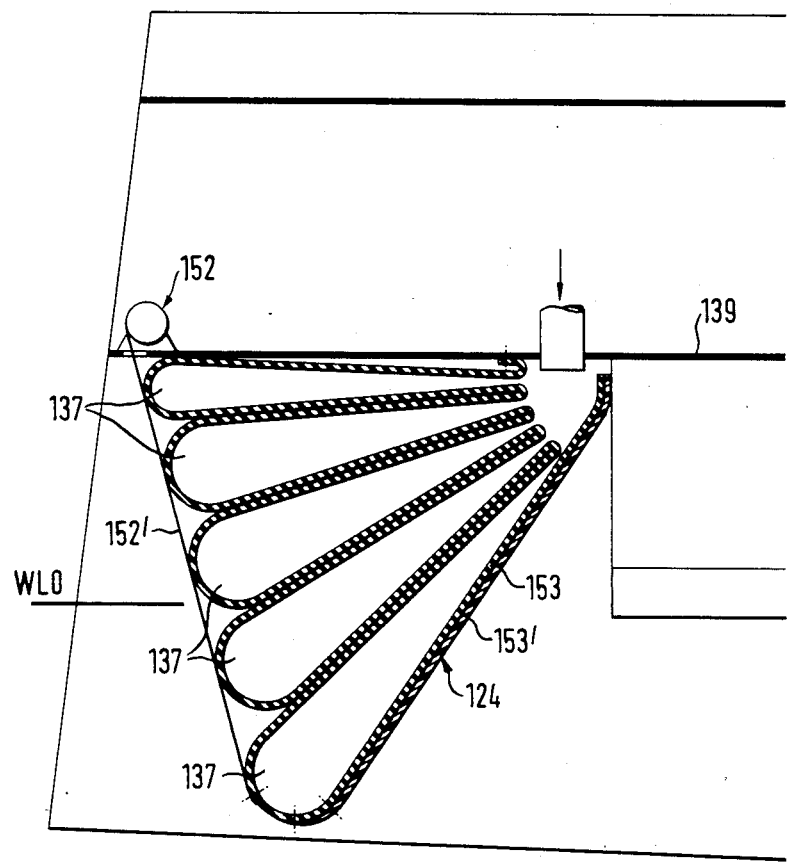

A transversely extending resilient skirt 124 is likewise provided in the stern region of the catamaran air cushion craft of the invention, as can be seen from FIGS. 1, 2 and 8. The resilient skirt 124 consists of resilient pockets 137 which are arranged behind (and above) one another and which can be displaced essentially about a transverse axis 135 (FIGS. 1 and 2) into the retracted position of FIG. 9, for example by means of pneumatic or hydraulic take in cable drive 152 (FIG. 8). The cables 152' act on the lower end of the skirt 124.

In order to provide the pockets which are arranged behind one another in FIG. 8 with adequate stability in conjunction with good resilience the frontmost wall 153 of the frontmost pocket 137 is provided with a synthetic or plastic support 153' so that it is of somewhat stiffer construction.

The resilient pockets 137 are inflated into the position shown in FIGS. 1 and 8 by connecting them to a source of pressurised air (arrow in FIGS. 8, 9) which endows them with the required stiffness. By letting out the air, i.e. by lowering the pressure and taking in the cable 152' by means of the drive 152 into position shown in FIG. 9 the pockets 137 can be upwardly swung completely out of the zone of the air space 125 so that it lies clearly above the water line WL0 for travel in the displacement mode during travel in the displacement mode and thus likewise does not contribute to the running resistance during travel in the displacement mode and cannot be damaged.

As seen in FIG. 2 the stern skirt extends laterally into recesses 136 of the floats 111 whereby good sealing against the undesired escape of air during hovercraft operation is obtained in this region.

It should also be pointed out that the skirts terminate somewhat above the water surface during hovercraft operation, i.e. that a small gap remains between the lower edges of the skirts and the water surface whereby a particularly low running resistance is obtained while travelling in the hovercraft mode, and the wear of the skirts can also be kept very low during travel in the hovercraft mode.

The length of the ship illustrated in FIGS. 1 to 3 amounts to ca. 55 m, the width to ca. 16 m and the draught to ca. 4 m.

We claim:

1. Catamaran air cushion water vehicle comprising:
    two spaced apart floats each having a bottom and a top and which extend parallel to one another in the longitudinal direction of the water vehicle and which have a float region (115) therebetween which is submerged during travel in a first displacement mode and defines a first displacement travel waterline (WL0), wherein the cross-sectional widths of the floats increase from the bottom thereof to the top thereof and a deck structure having a top and a bottom rigidly connecting said floats together at the tops thereof;
    resilient skirts which are arranged at a stem and at a stern between the floats, said skirts extending at least approximately to the water surface and, together with the floats, bound an air space between a base of the deck structure and the water surface;
    main propulsion units and drive propulsion means arranged in the stern region of the floats and which are driven by said main propulsion units; and
    fans which blow air sucked in from outside the bounded air space into the bounded air space beneath the bottom of the deck structure in order to lift the water vehicle from travel in the first displacement mode to travel in a second air cushion mode on a second air cushion travel waterline (WL1);
    the floats (111) each having above said first displacement travel waterline (WL0) a hull section (112) having an upper end region and which has a width increasing inwardly of the vehicle in a step-like manner, at least along a substantial portion of the total length of said floats (111) with said hull sections (112) having accommodated therein the main propulsion units (114) and the deck structure (113) being attached to upper end regions of the hull sections (112).

2. A water vehicle in accordance with claim 1, characterised in that the hull-section (112) extends over almost the full length of the ship and accommodates, in addition to the main propulsion units (114), also further units, such as fan drive units (116), electrogenerators, air-conditioning systems, and water preparation systems.

3. A water vehicle in accordance with claim 1, characterised in that the main propulsion units (114) are located near the middle of the longitudinal length of the ship.

4. A water vehicle in accordance with claim 1, characterised in that the hull sections (112) have their largest widths located near the middle of the longitudinal length of the ship.

5. A water vehicle in accordance with claim 4, characterised in that the hull sections (112) become continuously narrower in the stem direction (forward direction) starting from the largest width, and in particular become narrower linearly, and finally no longer merge in step-like manner but instead continuously into the float region (115) associated therewith.

6. A water vehicle in accordance with claim 5, characterised in that the hull sections (112) substantially retain the largest width in the stern direction (rearward direction).

7. A water vehicle in accordance with claim 4, characterised in that the floats (111) include a keel line (120) which rises slightly from the stem to the stern and indeed preferably linearly at an angle of 1° to 3° and in particular of approximately 2°.

8. A water vehicle in accordance with claim 1, characterised in that the height of each hull sections (112) at a location near the middle of the longitudinal length of the ship amounts to 0.8 to 1.2 times the height of the float region (115) associated therewith and is in particular approximately the same as the height of the displacement mode float region (115).

9. A water vehicle in accordance with claim 1, characterised in that the width of each float (111) at a position near the middle of the longitudinal length of the ship at the transition from the displacement mode float region (115) to the hull section (112) increases by 30 to 70%, preferably by 40 to 60% and in particular by approximately 50% in substantially step-like manner, particularly via gently rounded or inclined transition regions (117) of low height.

10. A water vehicle in accordance with claim 1, characterised in that the floats (111) increase in width outwardly substantially continuously and preferably in small steps (118).

11. A water vehicle in accordance with claim 1, characterised in that the transition region (117) from each displacement mode float region (115) to a hull section (112) extends at an angle of 20° to 40° and in particular at an angle of approximately 30° to the horizontal.

12. A water vehicle in accordance with claim 1, characterised in that the displacement mode float regions (115) include inner walls that extend substantially parallel to one another from the stem to the stern.

13. A water vehicle in accordance with claim 1, characterised in that the floats (111) are subdivided by at least one and preferably by several decks (121, 121') into buoyancy chambers which are sealed relative to one another.

14. A water vehicle in accordance with claim 13, characterised in that one of said at least one deck (121') is located in a region of transition (117) from the displacement mode float region (115) to the hull section (112).

15. A water vehicle in accordance with claim 1, characterised in that the main propulsion units (114) are constructed as containers which are suspended at their top side on the deck structure (113) and at their lower side are braced sideways and in the longitudinal direction against the floats.

16. A water vehicle, in particular in accordance with claim 1, further including exhaust ducts (122) of combustion engines on the main propulsion units which (114), open into the space bounded by the floats (111) and the skirts (123, 124), in particular into the air space (125) which is located above the water surface during travel in the displacement mode, with the air cushion pressure being smaller or the same as the exhaust gas pressure of the attached combustion engines.

17. A water vehicle in particular in accordance with claim 1, characterised in that stabilizer fins (126) which are pivotable about transverse axes (127) are arranged in the lower end region of the floats (111) at the inside, i.e. between the floats, with the stabilizer fins being so controlled that they assist the transition from travel in the displacement mode into the air cushion mode and/or assist the exceeding of a critical speed range during travel in the hovercraft mode at higher speeds.

18. A water vehicle in accordance with claim 17, characterised in that a pair of stabilizer fins (126) is provided at the stem which are so controlled that they assist the transition from travel in the displacement mode into travel in the hovercraft mode and/or assist the exceeding of a critical speed range during travel in the hovercraft mode at higher speeds.

19. A water vehicle in accordance with claim 18, characterised in that a further pair of stabilising fins are providing in the stern region of the floats (111) and are so controlled that they assist the transition from travel in the displacement mode to travel in the hovercraft mode and/or assist the exceeding of a critical speed range during travel in the hovercraft mode at higher speeds.

20. A water vehicle, in particular in accordance with claim 1, wherein a downwardly extendable and retractable column carrying a sonar device at its lower end is arranged on the deck structure between the floats, with the lower end of the column being submersible below the water surface both during travel in the displacement mode and during travel in the hovercraft mode, characterised in that a stabilising fin arrangement (13) is provided at the lower end region of the column (129) which preferably continuously lies beneath the water surface during travel in the displacement mode.

21. A water vehicle in accordance with claim 20, characterised in that the column (129) is telescopically extendable and retractable.

22. A water vehicle in accordance with claim 20, characterised in that, in the retracted state of the column (129), its lower end is located under water during travel in the displacement mode.

23. A water vehicle in accordance with claim 20, characterised in that the sonar device (128) has a stroke which is larger than a height difference between travel in the displacement mode and travel in the hovercraft mode, and indeed is preferably 40 to 60% and in particular approximately 50% greater than this height difference.

24. A water vehicle in accordance with claim 20, characterised in that the column (129) is arranged at a center between the floats (111).

25. A water vehicle, in particular in accordance with claim 1, characterised in that the stem and/or stern skirts (123; 124) can be moved out of their operating position for travel in the hovercraft mode, and can in particular be elevated and preferably rearwardly pivoted, to such an extent, that during travel in the displacement mode they no longer or only unimportantly contact the water surface, at least in calm water.

26. A water vehicle in accordance with claim 25, wherein the front skirt is formed by resilient pockets which are folded rearwardly and rounded at the front, which are secured at the top to the deck structure and which are located in a direction of flow of lift air during travel in the hovercraft mode, characterised in that pivot arms (132) which extend substantially from the top downwardly are secured in a front region of the pockets (131), are pivotable rearwardly about an upper transverse shaft (133) and, on being pivoted, pivot regions of the elastic pockets which come into contact with the water surface during travel in the displacement mode upwardly away from the water surface.

27. A water vehicle in accordance with claim 25, characterised in that, when being upwardly pivoted a upper mounting of pockets (131) remains unchanged and the pockets are resiliently deformed.

28. A water vehicle in accordance with claim 25, characterised in that a chamber (134) is provided above the front skirt (123) for accommodating the elevated skirt (123).

29. A water vehicle in accordance with claim 25, characterised in that the stern skirt (124) extends into lateral internal recesses (136) of the floats (111), with side end faces being sealed relative to sidewalls of the recesses (136).

30. A water vehicle in accordance with claim 25, wherein the stern skirts consist of resilient pockets which extend parallel to one another and are arranged substantially behind one another, characterised in that the pockets (13) are attached to a source of air pressure and are selectively inflated or relieved of pressure.

31. A water vehicle in accordance with claim 25, characterised in that the skirts (123, 124) can be moved into and fixed in intermediate positions between the position for travel in the pure displacement mode and the position for travel in the pure hovercraft mode.

* * * * *